US012236632B2

(12) United States Patent
Sekido

(10) Patent No.: US 12,236,632 B2
(45) Date of Patent: Feb. 25, 2025

(54) INFORMATION PROCESSING APPARATUS AND INFORMATION PROCESSING METHOD

(71) Applicant: TOSHIBA TEC KABUSHIKI KAISHA, Tokyo (JP)

(72) Inventor: Takuya Sekido, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 374 days.

(21) Appl. No.: 17/685,416

(22) Filed: Mar. 3, 2022

(65) Prior Publication Data

US 2022/0319044 A1 Oct. 6, 2022

(30) Foreign Application Priority Data

Apr. 2, 2021 (JP) .................................. 2021-063534

(51) Int. Cl.
*G06V 20/52* (2022.01)
*G06F 3/01* (2006.01)
*G06T 7/593* (2017.01)
*G06T 7/73* (2017.01)

(52) U.S. Cl.
CPC ............. *G06T 7/73* (2017.01); *G06F 3/011* (2013.01); *G06T 7/593* (2017.01); *G06V 20/52* (2022.01); *G06T 2207/30204* (2013.01)

(58) Field of Classification Search
CPC . G06T 7/73; G06T 7/593; G06T 2207/30204; G06T 2207/10016; G06T 2207/10021; G06T 2207/30196; G06T 7/74; G06F 3/011; G06F 3/0304; G06F 3/014; G06V 20/52; G06V 10/225
See application file for complete search history.

(56) References Cited

U.S. PATENT DOCUMENTS 9,049,428 B2  6/2015 Kuroda
10,203,762 B2 * 2/2019 Bradski ................ H04N 21/414
10,657,704 B1 * 5/2020 Han ........................ G06T 19/20
(Continued)

FOREIGN PATENT DOCUMENTS

JP  2017-111722  6/2017
JP  2021-001410  1/2021

OTHER PUBLICATIONS

Japanese Office Action for Japanese Patent Application No. 2021-063534 dated Oct. 22, 2024.

*Primary Examiner* — Gregory A Morse
*Assistant Examiner* — Renae A Bitor
(74) *Attorney, Agent, or Firm* — Amin, Turocy & Watson, LLP

(57) ABSTRACT

It is possible to easily monitor work performed by a worker with a detection unit detects a marker reflected in an image obtained by imaging a predetermined imaging space by a camera. A first determination unit determines a distance from the camera to the marker detected by the detection unit. A second determination unit determines, in consideration of the distance determined by the first determination unit, an article arranged in a predetermined arrangement space as a work target by a worker to which the marker detected by the detection unit is attached if an object virtualized at a predetermined position relative to the marker detected by the detection unit and the arrangement space have a predetermined positional relation.

17 Claims, 5 Drawing Sheets

(56) References Cited

U.S. PATENT DOCUMENTS

| | | |
|---|---|---|
| 11,790,624 B2 | 10/2023 | Nishimura |
| 11,967,101 B2* | 4/2024 | Nakamura ................ G06T 7/73 |
| 2012/0062725 A1* | 3/2012 | Wampler, II ............. G01V 8/12 |
| | | 348/86 |
| 2019/0243344 A1* | 8/2019 | Bauer .............. G05B 19/40935 |
| 2020/0126447 A1 | 4/2020 | Yoshimoto et al. |
| 2023/0166366 A1* | 6/2023 | Hsu ................... G05B 19/4183 |
| | | 702/189 |

* cited by examiner

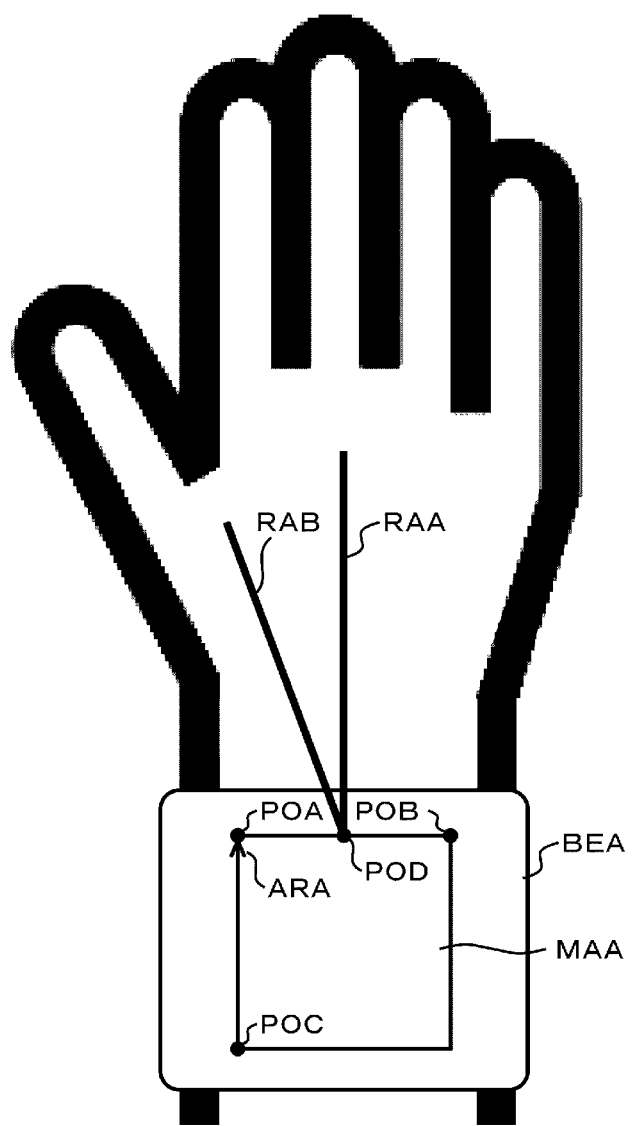

INFORMATION PROCESSING APPARATUS AND INFORMATION PROCESSING METHOD

CROSS-REFERENCE TO RELATED APPLICATION

This application is based upon and claims the benefit of priority from Japanese Patent Application No. 2021-063534, filed on Apr. 2, 2021, the entire contents of which are incorporated herein by reference.

FIELD

Embodiments described herein relate generally to an information processing apparatus and an information processing method.

BACKGROUND

Various monitoring systems that monitor work performed by a worker on a manufacturing line or the like are proposed. However, the systems are not easy to implement since a large number of sensors and complicated information are processing necessary. In view of such circumstances, the work performed by the worker is desired to be easily monitored.

DESCRIPTION OF THE DRAWINGS

FIG. 6 is a diagram showing a modification of an object.

DETAILED DESCRIPTION

In general, according to one embodiment, there is provided an information processing apparatus and an information processing method that can easily monitor work performed by a worker.

According to an embodiment, an information processing apparatus includes a detection unit, a first determination unit, and a second determination unit. The detection unit detects a marker reflected in an image obtained by imaging a predetermined imaging space by a camera. The first determination unit determines a distance from the camera to the marker detected by the detection unit. The second determination unit determines, in consideration of the distance determined by the first determination unit, work related to an article arranged in a predetermined arrangement space as work performed by a worker to which the marker detected by the detection unit is attached when an object virtualized at a predetermined position relative to the marker detected by the detection unit and the arrangement space have a predetermined positional relation.

Figure 1:
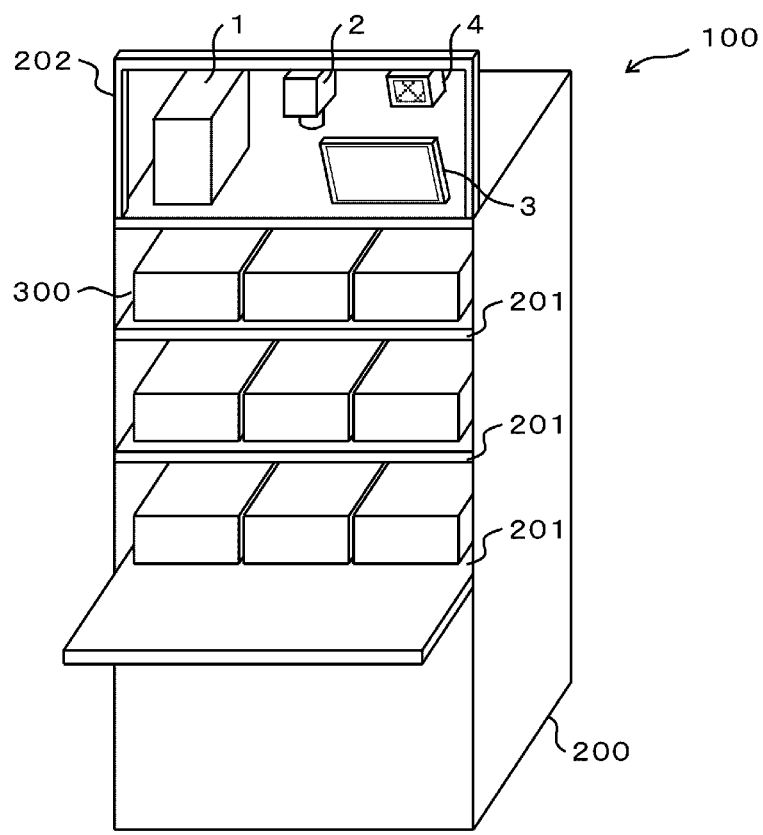
FIG. 1 is a perspective view showing an appearance of a monitoring system according to an embodiment.

Hereinafter, an example of an embodiment will be described with reference to the drawings. In the embodiment, a monitoring system that monitors work performed by taking out components in a predetermined order from a component box placed on a component shelf will be described as an example. FIG. 1 is a perspective view showing an appearance of a monitoring system 100 according to the embodiment.

The monitoring system 100 is provided on a component shelf 200. The component shelf 200 has a hollow rectangular parallelepiped shape with one surface opened. The component shelf 200 includes plural shelf plates 201 and a support member 202. In the following description, the opened one surface of the component shelf 200 is referred to as a front surface of the component shelf 200, and a direction of the front surface as viewed from the component shelf 200 is referred to as front. The shelf plate 201 is provided in an internal space of the component shelf 200. The number and positions of the shelf plates 201 are free, and FIG. 1 shows three shelf plates 201. Plural component boxes 300 are arranged on the shelf plates 201 as shown in the figure. Each of the component boxes 300 accommodates a component. In general, components accommodated in the plural component boxes 300 are different from each other. An arrangement place of each of the component boxes 300 is predetermined. The support member 202 has a gate shape and is attached to an outer surface of a top plate of the component shelf 200 in a state of protruding upward.

The monitoring system 100 includes an information processing apparatus 1, a camera unit 2, a display unit 3, and a speaker unit 4. The information processing apparatus 1 executes information processing for monitoring a worker who performs predetermined work using the components accommodated in the component boxes 300. The information processing apparatus 1 is placed on the top plate of the component shelf 200. Alternatively, the information processing apparatus 1 may be placed at any position in the component shelf 200, such as in an internal space in a lower portion of the component shelf 200, or may be attached to an outer side of a side wall of the component shelf 200. The information processing apparatus 1 may be disposed on a floor on which the component shelf 200 is placed, or at anyplace irrelevant to the component shelf 200, such as a room separate from a room in which the component shelf 200 is disposed.

The camera unit 2 is attached to the support member 202. The camera unit 2 images a top view of a predetermined imaging area in front of the component shelf 200. The camera unit 2 measures a distance to an article located in the imaging area. The camera unit 2 includes a camera device suitable for measuring a distance to a subject, such as a time of flight (TOF) camera or a stereo camera. Alternatively, the camera unit 2 may include a general camera device having no distance measurement function and a distance sensor separate from the camera device. The camera unit 2 may be disposed in any form as long as the camera unit 2 can image the imaging area. For example, the camera unit 2 may be attached to a ceiling of the room in which the component shelf 200 is disposed.

The display unit 3 displays a screen for notifying the worker of various pieces of information. The display unit 3 may include various display devices such as a liquid crystal display and a lamp. The display unit 3 is placed on the top plate of the component shelf 200 in a state in which the worker can easily view the screen. However, the display unit 3 may be attached to the outer side of the side wall of the component shelf 200 or the like. Further, the display unit 3 may be disposed at any place separate from the component shelf 200, for example, may be attached to a wall of the room in which the component shelf 200 is disposed, or may hung from the ceiling of the room.

The speaker unit 4 outputs various sounds for notifying the worker of various pieces of information. The speaker unit 4 is attached to the support member 202 in a state in which the worker can easily hear an output sound. However, the speaker unit 4 may be attached to the outer side of the side wall of the component shelf 200 or the like. Further, the speaker unit 4 may be disposed at anyplace separate from the component shelf 200, for example, may be attached to the wall of the room in which the component shelf 200 is disposed, or may hung from the ceiling of the room.

Figure 2:
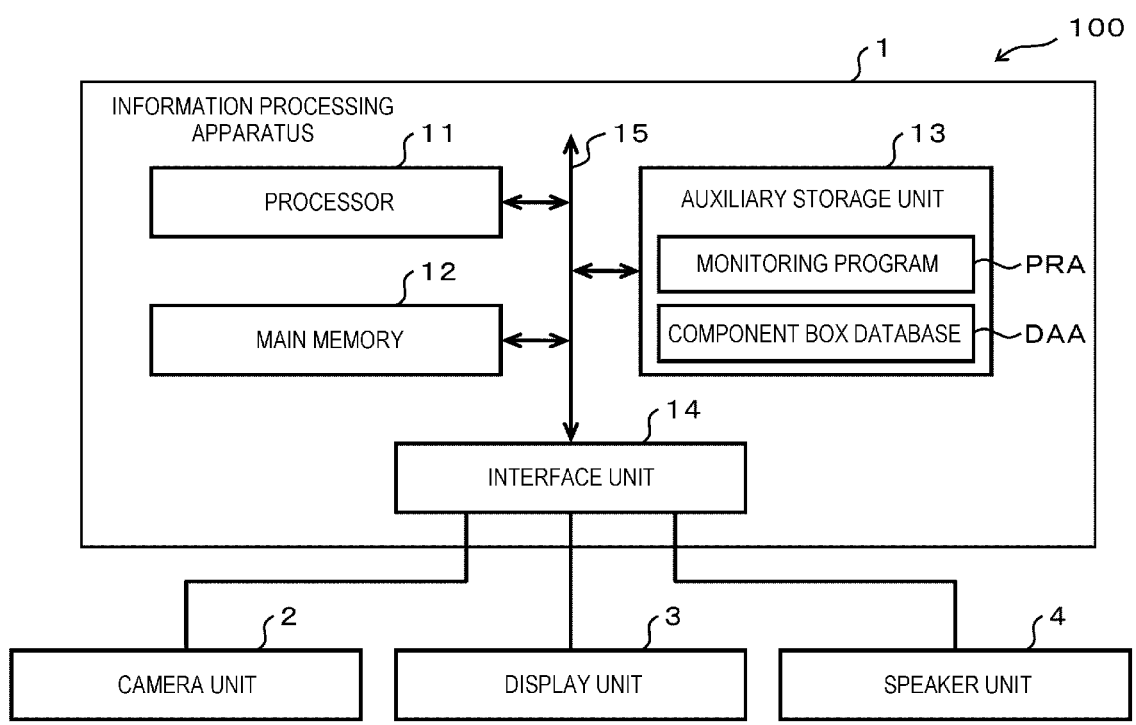
FIG. 2 is a block diagram showing a main circuit configuration of an information processing apparatus shown in FIG. 1.

FIG. 2 is a block diagram showing a main circuit configuration of the information processing apparatus 1. In FIG. 2, the same elements as those shown in FIG. 1 are denoted by the same reference numerals. The information processing apparatus 1 includes a processor 11, a main memory 12, an auxiliary storage unit 13, an interface unit 14, and a transmission line 15.

The processor 11, the main memory 12, the auxiliary storage unit 13, and the interface unit 14 can communicate with each other via the transmission line 15. The processor 11, the main memory 12, and the auxiliary storage unit 13 are connected by the transmission line 15 to constitute a computer for controlling the information processing apparatus 1.

The processor 11 corresponds to a central unit of the computer. The processor 11 executes information processing for implementing various functions of the information processing apparatus 1 in accordance with an information processing program such as an operating system and an application program. The processor 11 is, for example, a central processing unit (CPU).

The main memory 12 corresponds to a main storage unit of the computer. The main memory 12 includes a nonvolatile memory area and a volatile memory area. The main memory 12 stores the information processing program in the nonvolatile memory area. The main memory 12 may store data necessary for the processor 11 to execute information processing in the nonvolatile or volatile memory area. The main memory 12 uses the volatile memory area as a work area in which data is appropriately rewritten by the processor 11. The nonvolatile memory area is, for example, a read only memory (ROM). The volatile memory area is, for example, a random access memory (RAM).

The auxiliary storage unit 13 corresponds to an auxiliary storage unit of the computer. As the auxiliary storage unit 13, for example, a storage unit using a well-known storage device such as an electric erasable programmable read-only memory (EEPROM), a hard disc drive (HDD), or a solid state drive (SSD) can be used. The auxiliary storage unit 13 stores data used when the processor 11 performs various types of processing, data created by the processing by the processor 11, or the like. The auxiliary storage unit 13 may store the information processing program.

The camera unit 2, the display unit 3, and the speaker unit 4 are connected to the interface unit 14. The interface unit 14 interfaces data exchange between the processor 11 and the camera unit 2, the display unit 3, and the speaker unit 4. As the interface unit 14, for example, known devices such as various interface boards such as a universal serial bus (USB) board can be used. Plural interface units 14 may be provided. The transmission line 15 includes an address bus, a data bus, a control signal line, and the like, and transmits data and control signals exchanged between the connected units.

The auxiliary storage unit 13 stores a monitoring program PRA that is one of information processing programs. The monitoring program PRA is an application program, and describes information processing to be described later for implementing the functions of the information processing apparatus 1. A part of the storage area of the auxiliary storage unit 13 is used as a storage area of a component box database DAA. The component box database DAA is a database for managing each of the plural component boxes 300.

Figure 3:
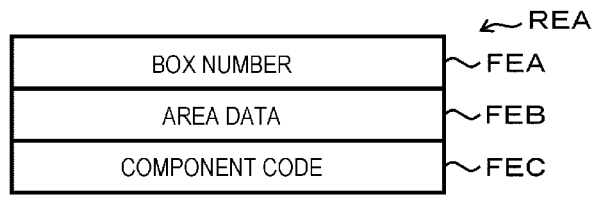
FIG. 3 schematically shows a configuration of a data record included in a component box database shown in FIG. 2.

FIG. 3 is a diagram schematically showing a configuration of a data record REA included in the component box database DAA. The component box database DAA is a set of plural data records REA associated with the plural component boxes 300. The data record REA includes fields FEA, FEB, and FEC. A box number that is an identifier of the associated component box 300 is set in the field FEA. Area data representing an arrangement space of a component related to the associated component box 300 is set in the field FEB. A component code that is an identifier of a component accommodated in the associated component box 300 is set in the field FEC.

As hardware of the information processing apparatus 1, for example, a general-purpose computer apparatus can be used. In general, the information processing apparatus 1 is transferred if the hardware in which no monitoring program PRA is stored in the auxiliary storage unit 13 and the monitoring program PRA are in separate states. In this case, the information processing apparatus 1 is configured by writing the monitoring program PRA in the auxiliary storage unit 13 according to work of any worker. The information processing apparatus 1 may be transferred in a state in which the monitoring program PRA is stored in the auxiliary storage unit 13. The monitoring program PRA can be transferred by recording the monitoring program PRA on a removable recording medium such as a magnetic disk, a magneto-optical disk, an optical disk, or a semiconductor memory, or by communication via a network. The monitoring program PRA may be stored in the main memory 12.

Next, an operation of the monitoring system 100 constituted as described above will be described. The worker is located in front of the component shelf 200, takes out the components from the component boxes 300 in the predetermined order, and performs work such as assembly of a product using the components. A box number is assigned to each of the plural component boxes 300, and a size of the component box 300, a component accommodated in the component box 300, or a position of the component box 300 on the component shelf 200 is predetermined. The component box database DAA is appropriately determined by, for example, an administrator of the monitoring system according to contents of these predetermined environments. An arrangement space indicated by the area data set in the field FEB of the data record REA is determined as, for example, an area corresponding to an accommodation space of the component inside the associated component box 300. The area data is determined as data indicating which area in the component shelf 200 and in a three-dimensional space around the component shelf 200 the arrangement space is. The area data may be any data as long as the area data can specify a rough position of the accommodation place of the component, such as data indicating which area in the three-dimensional space the component box 300 occupies.

The worker performs the work in a state in which the worker wears on a wrist a band to which a marker reflected in the image imaged by the camera unit 2 is attached. The marker has a rectangular shape, and a first corner, a second corner, and a third corner among four corners thereof can be identified by image processing. The worker wears the band such that the first corner and the second corner of the marker are located closer to fingertips than the third corner and the other corner.

Figure 4:
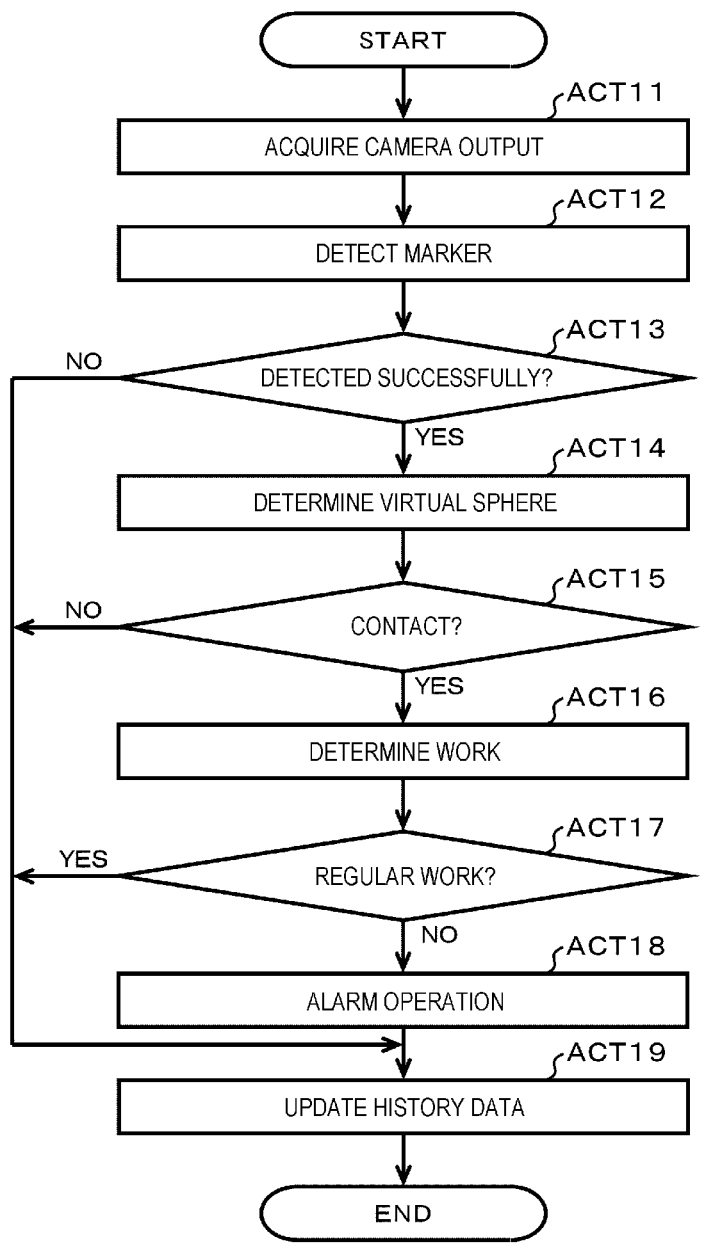
FIG. 4 is a flowchart of monitoring processing by a processor shown in FIG. 2.

If the monitoring system 100 is in a state of monitoring the work of the worker, the camera unit 2 images the imaging area. This imaging may be typically imaging of a moving image, but may be repeated imaging of a still image. In the information processing apparatus 1, the processor 11 starts information processing (hereinafter, referred to as monitoring processing) based on the monitoring program PRA every time predetermined start timing arrives. The start timing is assumed to be, for example, timing for each frame rate of the camera unit 2. However, the start timing may be optionally determined by a creator of the monitoring program PRA, an administrator of the monitoring system 100, or the like. FIG. 4 is a flowchart of monitoring processing by the processor 11. A content of processing to be described below is merely an example, and it is possible to appropriately change an order of some of the processing, omit some of the processing, add another processing, and the like.

In ACT 11, the processor 11 acquires output data of the camera unit 2. If the camera unit 2 images a moving image, the camera unit 2 images at a predetermined frame rate and outputs frame data obtained as a result. The camera unit 2 measures a distance to an article present in the imaging area with respect to plural measurement points in a frame area, and outputs measurement data obtained as a result. Therefore, the processor 11 acquires latest frame data and measurement data output from the camera unit 2. The processor 11 stores the acquired frame data and measurement data in the main memory 12 or the auxiliary storage unit 13.

In ACT 12, the processor 11 detects a marker reflected in the image represented by the frame data acquired in ACT 11. The processor 11 attempts to extract an area in which a feature of the marker appears from the corresponding image. If the marker is reflected in the image, the processor 11 detects an area in which the marker is reflected as a marker. Thus, by the processor 11 executing the information processing based on the monitoring program PRA, the computer including the processor 11 as the central unit functions as the detection unit.

In ACT 13, the processor 11 confirms whether the marker is successfully detected. If the marker is detected in ACT 12, the processor 11 determines YES and proceeds to ACT 14. In ACT 14, the processor 11 determines a spherical area in the component shelf 200 and in a three-dimensional area (hereinafter referred to as a monitoring area) around the component shelf 200. That is, the processor 11 virtualizes a sphere existing in the monitoring area. Hereinafter, the sphere is referred to as a virtual sphere. The virtual sphere is an example of a virtual object.

Figure 5:
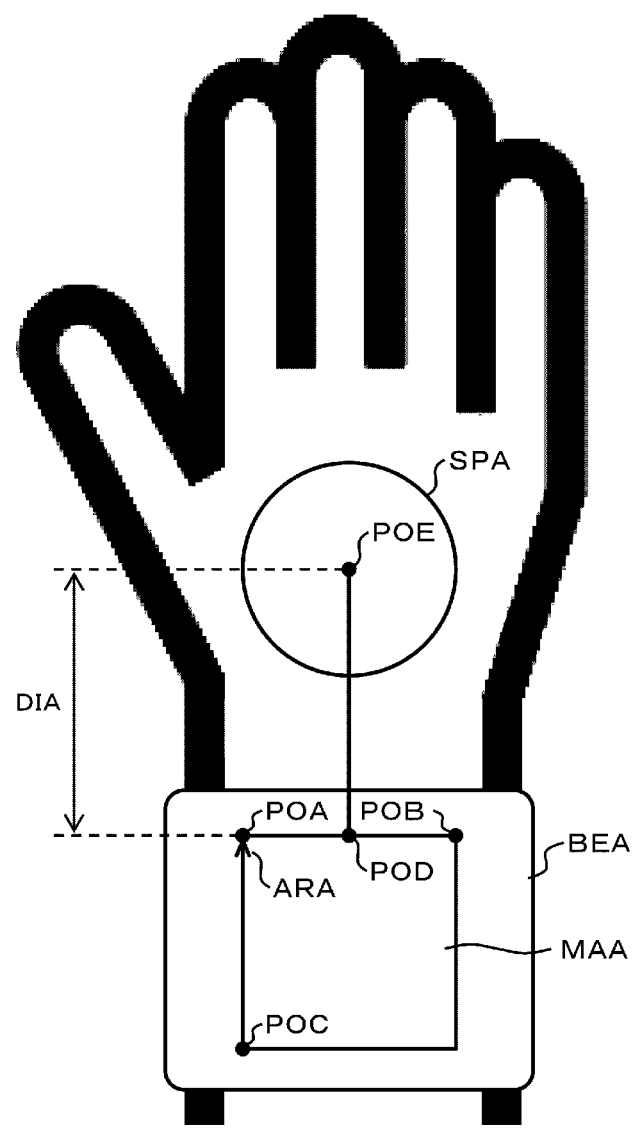
FIG. 5 is a diagram showing processing for determining a virtual sphere.

FIG. 5 is a diagram showing processing for determining a virtual sphere. FIG. 5 shows an example in which a hand of the worker, a belt BEA worn on the worker, and a marker MAA attached to the belt BEA are reflected in the image. The hand of the worker and the belt BEA are shown for reference, and are not objects to be processed by the processor 11.

Specific processing of the processor 11 for determining a virtual sphere is as follows, for example. First, the processor 11 obtains positions POA, POB, and POC of the first corner, the second corner, and the third corner of the marker MAA in the image. The processor 11 determines a direction of the position POA with reference to the position POC as a fingertip direction. That is, the processor 11 determines a direction of an arrow ARA in FIG. 5 as the fingertip direction. Thereafter, the processor 11 determines a position POE of a center of the virtual sphere in a horizontal plane as a position separated from a position POD of a midpoint between the position POA and the position POB by a specified distance DIA in the fingertip direction. The processor 11 determines a distance from the camera unit 2 to the marker MAA (hereinafter, referred to as an imaging distance) based on the measurement data acquired in ACT 11. For example, the processor 11 selects a measurement value related to a measurement point in the area in which the marker MAA is detected from measurement values of plural measurement points indicated by the measurement data acquired in ACT 11, and determines a distance indicated by the measurement value as the imaging distance. Thus, by the processor 11 executing the information processing based on the monitoring program PRA, the computer including the processor 11 as the central unit functions as a first determination unit.

For example, the processor 11 changes the specified distance DIA according to the determined imaging distance. A relation between the imaging distance and the specified distance DIA is predetermined by, for example, the creator of the monitoring program PRA or the like such that the specified distance DIA decreases as the imaging distance increases. The processor 11 may calculate the specified distance DIA according to the imaging distance by using an equation predetermined by the creator of the monitoring program PRA or the like in consideration of optical characteristics of the camera unit 2. Further, the processor 11 determines a three-dimensional position of the center based on the position POE and the imaging distance, and determines a sphere centered on the position as a virtual sphere SPA. The processor 11 changes a size of the virtual sphere SPA in accordance with the imaging distance. A relation between the imaging distance and the size of the virtual sphere SPA is predetermined by, for example, the creator of the monitoring program PRA or the like such that the virtual sphere SPA becomes smaller as the imaging distance increases. The processor 11 may calculate the size of the virtual sphere SPA according to the imaging distance by using the equation predetermined by the creator of the monitoring program PRA or the like in consideration of optical characteristics of the camera unit 2.

In ACT 15, the processor 11 confirms whether the virtual sphere SPA is in contact with the arrangement space related to any one of the component boxes 300. In this confirmation, for example, a known algorithm for determining a collision between objects can be used. For example, the processor 11 selects one of the data records REA included in the component box database DAA, and confirms whether a part of the virtual sphere SPA overlaps with the arrangement space indicated by the area data set in the field FEB. For example, the processor 11 repeats the above confirmation while sequentially changing the data record REA to be selected until an overlap can be confirmed. If the overlap can be confirmed, the processor 11 determines YES as being in contact and proceeds to ACT 16.

In ACT 16, the processor 11 determines work performed by the worker. For example, the processor 11 determines the work performed by the worker as work using a component identified by a component code set in the field FEC of the data record REA selected when the processor 11 confirms that a part of the virtual sphere SPA overlaps. Thus, by the processor 11 executing the information processing based on the monitoring program PRA, the computer including the processor 11 as the central unit functions as a second determination unit.

In ACT 17, the processor 11 confirms whether the work determined as described above is current regular work. For example, the processor 11 refers to history data in which the work performed by the worker is recorded over time and schedule data indicating a schedule of work to be performed by the worker to determine work to be performed by the worker at present. If the work does not match the work determined in ACT 16, the processor 11 determines NO as not being the regular work and proceeds to ACT 18. Conditions under which the processor 11 determines that the work is the regular work may be appropriately determined by, for example, the creator of the monitoring program PRA or the like. The history data and the schedule data are stored in, for example, the main memory 12 or the auxiliary storage unit 13. Alternatively, the history data and the schedule data may be stored in a storage device provided in another server device or the like capable of communicating via a communication network such as a local area network (LAN), for example.

In ACT 18, the processor 11 executes an alarm operation. For example, the processor 11 displays a predetermined alarm screen on the display unit 3. For example, the processor 11 blinks a lamp provided in the display unit 3. For example, the processor 11 outputs a predetermined alarm sound by the speaker unit 4. For example, the processor 11 outputs a predetermined voice message by the speaker unit 4. The processor 11 may execute, as the alarm operation, various other operations that allow the worker to perceive an alarm. The processor 11 may execute only one of these alarm operations, or may execute plural alarm operations simultaneously or at staggered times. If an end condition is satisfied, the processor 11 stops the alarm operation and proceeds to ACT 19. The end condition may be appropriately determined by, for example, the creator of the monitoring program PRA, the administrator of the monitoring system 100 or the like. The end condition is assumed to be, for example, a case where the duration of the alarm operation reaches specified time. The end condition is assumed to be, for example, a case where predetermined work is performed by the worker.

If no marker is detected in ACT 12, the processor 11 determines NO in ACT 13 and proceeds to ACT 19. In ACT 15, if the overlap is not confirmed even if all of the data records REA included in the component box database DAA are selected, the processor 11 determines NO as being not in contact and proceeds to ACT 19. If in ACT 17, the work to be performed by the worker at present matches the work determined in ACT 16, the processor 11 determines YES as being the regular work and proceeds to ACT 19. In these cases, the processor 11 passes ACT 18 and does not perform the alarm operation. In ACT 19, the processor 11 updates the history data to add data indicating a current action of the worker. The processor 11 ends the monitoring processing.

As described above, according to the information processing apparatus 1, the work can be monitored by the virtual object based on the imaged image and the confirmation of the positional relation between the object and the arrangement space, and can be implemented by simple information processing.

According to the information processing apparatus 1, since the object is the virtual sphere SPA in the spherical area, work can be monitored by knowing a rough position of the hand of the worker while information processing for determining the object is simple.

According to the information processing apparatus 1, if the contact between the object and the arrangement space is detected, the work using the component arranged in the arrangement space is determined as the work performed by the worker, and thus the determination of the work can be implemented by simple information processing as compared with a case where the work is determined based on an actual action of the worker involved in the work.

The embodiment can be variously modified as follows. The virtual object is not limited to a sphere, and may be an object having any other shape.

FIG. 6 is a diagram showing a modification of the virtual object. In the modification, rays RAA and RAB are virtual objects. The ray RAA is assumed to be a straight line having a predetermined length extending in the fingertip direction with the position POD as one end. The ray RAB is assumed to be a straight line having a predetermined length extending in a direction having a predetermined inclination with respect to the fingertip direction with the position POD as one end. For example, the processor 11 may determine the work of the worker in accordance with a contact state between tips of the rays RAA and RAB and the arrangement space.

The processor 11 can appropriately change a predetermined positional relation. For example, the processor 11 determines the predetermined positional relation if a separation distance of the virtual sphere SPA to the arrangement space is smaller than a predetermined distance.

The processing for determining that the object and the arrangement space have a predetermined positional relation can be appropriately changed. For example, the processor 11 associates the arrangement space with a plane through which the hand passes if the hand is inserted into the arrangement space, and then determines that the work related to the component arranged in the arrangement space associated with the plane is the work of the worker in accordance with the contact between the plane and the object.

The processor 11 can appropriately change the work to be determined. For example, the processor 11 determines work using a tool as the work by the worker if the arrangement space defined as a space in which the tool is arranged and the object have a predetermined positional relation.

Some or all of the functions implemented by the processor 11 by the information processing may be implemented by hardware that executes the information processing that is not based on a program such as a logic circuit. Further, each of the functions may be implemented by combining software control with the hardware such as the logic circuit.

While embodiments have been described, the embodiments have been presented by way of examples only, and are not intended to limit the scope of the disclosure. Indeed, the novel embodiments described herein may be embodied in a variety of other forms, and various omissions, substitutions and changes may be made without departing from the spirit of the disclosure. The embodiments and modifications thereof are included in the scope and gist of the disclosure, and are also included in the inventions described in the claims and equivalents thereof.

What is claimed is:

1. An information processing apparatus, comprising:
a memory that stores an information processing program; and
at least one processor that executes the information processing program stored in the memory, wherein, based on execution of the information processing program, the at least one processor is configured to function as:

a detector configured to detect a marker reflected in an image obtained from a predetermined imaging space by a camera;

a first determination component configured to determine a distance from the camera to the marker detected by the detector; and a second determination component configured to determine, in consideration of the distance determined by the first determination component, work related to an article arranged in a predetermined arrangement space as work performed by a worker to which the marker detected by the detector is attached if an object that is virtualized at a predetermined position relative to the marker detected by the detector and the predetermined arrangement space have a predetermined positional relation, wherein the second determination component virtualizes the object as a spherical area having a center position determined by a position of the marker detected by the detector and a size corresponding to the distance determined by the first determination component.

2. The information processing apparatus according to claim 1, wherein the second determination component detects contact between the object and the predetermined arrangement space, and determines the predetermined positional relation by the detection.

3. The information processing apparatus according to claim 1, wherein if the predetermined arrangement space in which a component is arranged as the article and the object have the predetermined positional relation, the second determination component determines the work related to the component as the work performed by the worker.

4. The information processing apparatus according to claim 1, wherein the camera comprises a time of flight camera or a stereo camera.

5. The information processing apparatus according to claim 1, wherein the marker is comprised on a wearable object, the wearable object configured to be wearable by the worker.

6. The information processing apparatus according to claim 5, wherein the wearable object is a wrist band.

7. An information processing method executed by a computer, the information processing method comprising:

detecting a marker reflected in an image obtained by imaging a predetermined imaging space by a camera;

determining a distance from the camera to the marker detected; and determining, in consideration of the distance determined by determining the distance, an article arranged in a predetermined arrangement space as a work target by a worker to which the marker detected is attached when an object that is virtualized at a predetermined position relative to the marker detected and the predetermined arrangement space have a predetermined positional relation, wherein the determining the work target comprises virtualizing the object as a spherical area having a center position determined by a position of the marker detected during the detecting and a size corresponding to the distance determined during the determining the distance.

8. The information processing method according to claim 7, wherein the determining the work target comprises detecting contact between the object and the predetermined arrangement space, and determining the predetermined positional relation by the detection.

9. The information processing method according to claim 7, wherein if the predetermined arrangement space in which a component is arranged as the article and the object have the predetermined positional relation, the determining the work target comprises determining the work related to the component as the work performed by the worker.

10. The information processing method according to claim 7, wherein detecting the marker comprises detecting the marker on a wearable object, the wearable object being wearable by the worker.

11. The information processing method according to claim 10, wherein the wearable object is a wrist band.

12. A monitoring system, comprising:

a memory that stores an information processing program; and at least one processor that executes the information processing program stored in the memory, wherein, based on execution of the information processing program, the at least one processor is configured to function as:

a detector configured to detect a marker reflected in an image obtained from a predetermined imaging space by a camera;

a first determination component configured to determine a distance from the camera to the marker detected by the detector;

a second determination component configured to determine, in consideration of the distance determined by the first determination component, work related to an article arranged in a predetermined arrangement space as work performed by a worker to which the marker detected by the detector is attached if an object that is virtualized at a predetermined position relative to the marker detected by the detector and the predetermined arrangement space have a predetermined positional relation; and a display configured to notify the worker about various pieces of information, wherein the second determination component virtualizes the object as a spherical area having a center position determined by a position of the marker detected by the detector and a size corresponding to the distance determined by the first determination component.

13. The monitoring system according to claim 12, wherein the second determination component detects contact between the object and the predetermined arrangement space, and determines the predetermined positional relation by the detection.

14. The monitoring system according to claim 12, wherein if the predetermined arrangement space in which a component is arranged as the article and the object have the predetermined positional relation, the second determination component determines the work related to the component as the work performed by the worker.

15. The monitoring system according to claim 12, wherein the camera comprises a time of flight camera or a stereo camera.

16. The monitoring system according to claim 12, wherein
the marker is comprised on a wearable object, the wearable object configured to be wearable by the worker.

17. The monitoring system according to claim 16, wherein
the wearable object is a wrist band.

* * * * *